US00RE36550E

United States Patent [19]

West

[11] E Patent Number: Re. 36,550

[45] Reissued Date of Patent: Feb. 8, 2000

[54] ADJUSTABLE MOUNTING FOR A POST SYSTEM

[76] Inventor: Ronald R. West, 545 E. 200 North, Provo, Utah 84606

[21] Appl. No.: 08/837,010

[22] Filed: Apr. 11, 1997

Related U.S. Patent Documents

Reissue of:

[64] Patent No.: 5,404,682
Issued: Apr. 11, 1995
Appl. No.: 08/190,385
Filed: Feb. 1, 1994

U.S. Applications:

[62] Division of application No. 07/856,639, Mar. 24, 1992, Pat. No. 5,307,598.

[51] Int. Cl.[7] ..... E02D 5/54; F16M 13/00

[52] U.S. Cl. ..... 52/165; 52/114; 52/155; 248/183.1; 248/288.31; 248/398; 248/516

[58] Field of Search ..... 52/165, 298, 114, 52/155; 248/516, 181.2, 288.51, 398; 403/90, 192, 193, 326, 328, 380, 375

[56] References Cited

U.S. PATENT DOCUMENTS

| | | | |
|---|---|---|---|
| 317,896 | 5/1885 | Vinton . | |
| 632,966 | 9/1899 | Mullenix . | |
| 892,105 | 6/1908 | White | 403/90 |
| 898,391 | 9/1908 | Peterson . | |
| 973,319 | 10/1910 | Thunen et al. . | |
| 1,083,582 | 1/1914 | Bates | 52/165 |
| 1,257,536 | 2/1918 | Schroeder . | |
| 1,679,623 | 8/1928 | Olsen . | |
| 1,877,074 | 1/1931 | Stanziale . | |
| 2,676,965 | 12/1969 | Deike . | |
| 3,011,597 | 2/1961 | Galloway et al. . | |
| 3,081,114 | 3/1963 | Esty . | |
| 3,152,668 | 10/1964 | Smith . | |
| 3,186,523 | 6/1965 | Brisse . | |
| 4,150,907 | 4/1979 | Thurnauer . | |
| 4,222,680 | 9/1980 | Browning . | |
| 4,320,608 | 3/1982 | Deike . | |
| 4,339,399 | 7/1982 | Klenk et al. . | |
| 4,603,520 | 8/1986 | Deike . | |
| 4,759,161 | 7/1988 | Kucyk et al. . | |
| 4,770,382 | 9/1988 | Lehti | 248/181.2 |

OTHER PUBLICATIONS

Nikon Corp. of Japan, Part No. AX–1 and AX–1s.

*Primary Examiner*—Christopher Kent
*Attorney, Agent, or Firm*—Clayton, Howarth & Cannon, P.C.

[57] ABSTRACT

An adjustable mounting for a post system for use in aligning and maintaining a post attached thereto to a desired vertical attitude to a ground surface. The adjustable mounting includes, as embodiments, a ball segment and seat combination that are movable with respect to one another, and in another embodiment involves a pair of interactive tapered washers, with the embodiments all including arrangements for clamping together the components that is a single bolt type fastener that is for maintaining the components of the adjustable mounting between a ground stake top surface, or ground surface, and a post bottom end or post insert base. The relative positioning of the seat to the ball segment and the tapered washers tapered surfaces to one another is to provide an off-set from a straight line axially through which adjustable mounting, that is transferred directly into a post, or a post insert with a post telescoped thereon, as an angle of that post to the vertical, which post can be used as a fences post, sign post, or the like, and may include an arrangement for mounting a container, such as a box or tube, cantilevered thereto that is intended for receiving delivered items, such as mail and/or newspapers.

36 Claims, 12 Drawing Sheets

ADJUSTABLE MOUNTING FOR A POST SYSTEM

Matter enclosed in heavy brackets [ ] appears in the original patent but forms no part of this reissue specification; matter printed in italics indicates the additions made by reissue.

This is a division of application Ser. No. 7/856,639, filed Mar. 24, 1992, now U.S. Pat. No. 5,307,598.

BACKGROUND OF THE INVENTION

1. Field of the Invention

This invention related to adjustable post mountings and in particular to a post ground anchor that is capable of being tilted to bring the post to a desired vertical attitude.

2. Prior Art

Posts and even ground mounting arrangements therefor for adjusting or tilting the post to a vertical attitude are not new. A recent patent to Deike, U.S. Pat. No. 4,603,520, shows an example of a mounting base for a sign post that will accommodate rotational, tilting and height adjustment. Where, like one embodiment the present invention, the Deike patent shows a ball and seat arrangement for providing tilting capability to a sign post, Deike utilizes four corner bolts to maintain that post tilted attitude rather than a ball and seat with a single bolt mounting like that of the present invention. Further, there is no teaching of a mail or newspaper box mounting to the mounting post in the Deike patent.

Additionally, a number of ground anchor arrangements for mounting posts, such as road side type sign posts, have been developed. Examples of such are shown in a U.S. Patents to Galloway, et al, U.S. Pat. No. 3,011,597, that involves an auger type post mount; Smith, U.S. Pat. No. 3,152,668, that teaches an anchor with a guy wire; Brisse, U.S. Pat. No. 3,186,523, that shows a wire anchoring system; Deike, U.S. Pat. Nos. 3,676,965 and 4,320,608, for sign post support sockets; and Klenk, et al U.S. Pat. No. , 4,339,899, that sets out a system for coupling a power transmission tower to a support base. None of which above cited patents involve a post and ground mount for a mail box system, like that of the present invention, whereby the post can be quickly and easily aligned to the vertical and provide for securely mounting a mail box, or the like, onto which post.

Additional to the above cited U.S. patents, a ball and socket mount utilizing a single bolt and nut combination for positioning and securing a transit to a horizontal attitude is provided in a transit system identified as an automatic level, manufactured by Nikon Corp. of Japan, Manufacturers Part No. AX-1 and AX-1S. Which Nikon system is, of course, for a different use and application than the arrangement of the system of the present invention.

SUMMARY OF THE INVENTION

It is a principal object of the present invention in an adjustable post mounting system to provide a system for mounting a straight post to a ground anchor that includes a capability for adjusting and maintaining the post to a desired vertical attitude relative to the ground surface.

Another object of the present invention is to provide, an adjustable mount for use with a ground anchor whereby the post can be set to a desired vertical attitude with respect to the ground surface and secured thereat by a single nut and bolt type coupling.

Another object of the present invention is to provide an adjustable mounting that includes at least a pair of members whose positioning relative to one another allows for providing a tilting of the post to correct for ground conditions, which relative positioning is maintained by a single bolt and nut coupling.

Another object of the present invention is to provide an arrangement of a ground mount for coupling to a post, the combination to provide a tight and secure coupling.

Still another object of the present invention is to provide a simple adjustable mounting for a post system where the individual components can be produced from an inexpensive and durable material, such as plastic, which system provides for ease of installation by a person with only simple tools and requires little or no mechanical skills.

The present invention is in an inexpensive, simple to install and yet durable post system. The post system includes a ball section or portion of an adjustable mount that can be fitted onto a ground stake that is to be driven into the earth, can be mounted to cement, or the like. The ball portion of the adjustable mount is for positioning in a seat that is for coupling to a post insert or into a post end. Both the post and post insert attitude to the vertical is adjustable and is maintained by a mounting that utilizes single nut and bolt fastener.

In one embodiment of the invention, the adjustable mount is a ball section and seat combination, where the ball section is maintained onto the top of a ground stake or anchor. The ball section is to fit into a seat that has a hemispherical inner surface with the components positioned and held together by a single bolt coupling. The bolt is fitted through a hole formed through the seat and ball section, which ball section hole is tapered from a bottom end outwardly to a top end to allow for the bolt to tilt across the top end of the hole. So arranged, the seat is positionable across the ball section surface and a nut is provided for turning, within the post insert, over a threaded end of the bolt passed through the seat and ball section clamping the surfaces together. Alternatively, a friction gasket can be included therebetween, or the ball section surface can be grooved or scored for providing non-slip coupling surfaces.

A second embodiment of which adjustable mounting involves a pair of sloping or tapered washers that are center holed to fit together as a stack and receive a bolt therethrough. Which bolt is also fitted through holes formed in opposing plates that are secured respectively, across the post insert bottom and the ground stake or anchor top surface. The washers fitted over one another have their tapered surface arranged juxtaposition to one another. The rotation of one of which washers over the other therefore increases or decreases, respectively, the thickness of the opposite washer stack edge. The washer stack top surface can therefore be angled to the vertical relative to its lower surface. Which angle translates to a tilt of the post, and is maintained by turning a nut over which bolt threaded end.

The post insert is for receiving an end of a post, such as a post for mounting a mail box, fitted thereover. For which coupling, screw holes are formed through both the post and post insert that, with the post telescoped thereon, align to receive screws turned therethrough, securing the components together. Resilient spacers are preferably arranged between the opposing surfaces of which post and post insert to provide a tight coupling. Alternatively, the ball seat can be imbedded directly into the bottom of the post to eliminate the post insert.

Another embodiment of an adjustable mounting, like that of the first embodiment, involves a ball and seat combination. Like the adjustable mounting of the first embodiment, a ball section that is for mounting through a plate to a ground stake is arranged to pass a mounting bolt through a center hole thereof to through a seat to provide a tilt from the vertical of that mounting bolt. That, with the mounting bolt to fitted through a seat, is translated to a displacement of the seat across the ball section seated therein. The bolt, after passage through the seat, is to receive a nut turned thereover, for clamping the ball section in the seat as the adjustable mounting. A ridge is preferably formed around body that contains the seat that is for snap fitting and locking into a slot that has been formed around the inside surface of the post, proximate to a lower end thereof. Which post further includes a window or port formed therein, for providing access into the tube for fitting and turning a nut onto the bolt threaded end that has passed through a center hole in the seat for clamping the ball section in the seat. In this embodiment, like the first embodiment, the opposing ball section and seat surfaces can be scored, or the like, to discourage movement of the one surface over the other, and a washer with a rough surface can be sandwiched between the surfaces also for discouraging relative movement after the ball section and seat surfaces are clamped together.

The post can receive a mail box, or the like, secured across a top end thereof, may mount an open newspaper tube cantilevered thereto, may be arranged as a fence post, or may be utilized for any function involving or requiring an upright, ground mounted post within the scope of this disclosure. A preferred cantilevered mounting is provided by horizontally slotting the mail box post with a pair of parallel slots that are each to receive one of a pair of tabs formed as extensions of the tube end. Which tabs are holed, each hole to receive a sloping peg that is fitted therethrough. The pegs are arranged for binding across the tab holes to inhibit withdrawal.

A mail box can be secured across the post top end utilizing a mount that includes a recess formed in the mount undersurface for receiving the post end, with screws turned through the contacting surfaces. Or, a frame for mount the mail box to the post end can be employed that is secured across the post end.

BRIEF DESCRIPTION OF THE DRAWINGS

These and other objects and features of the invention will become more apparent from the following description in which the invention is described in detail in conjunction with the accompanying drawings.

DETAILED DESCRIPTION

Figure 1:
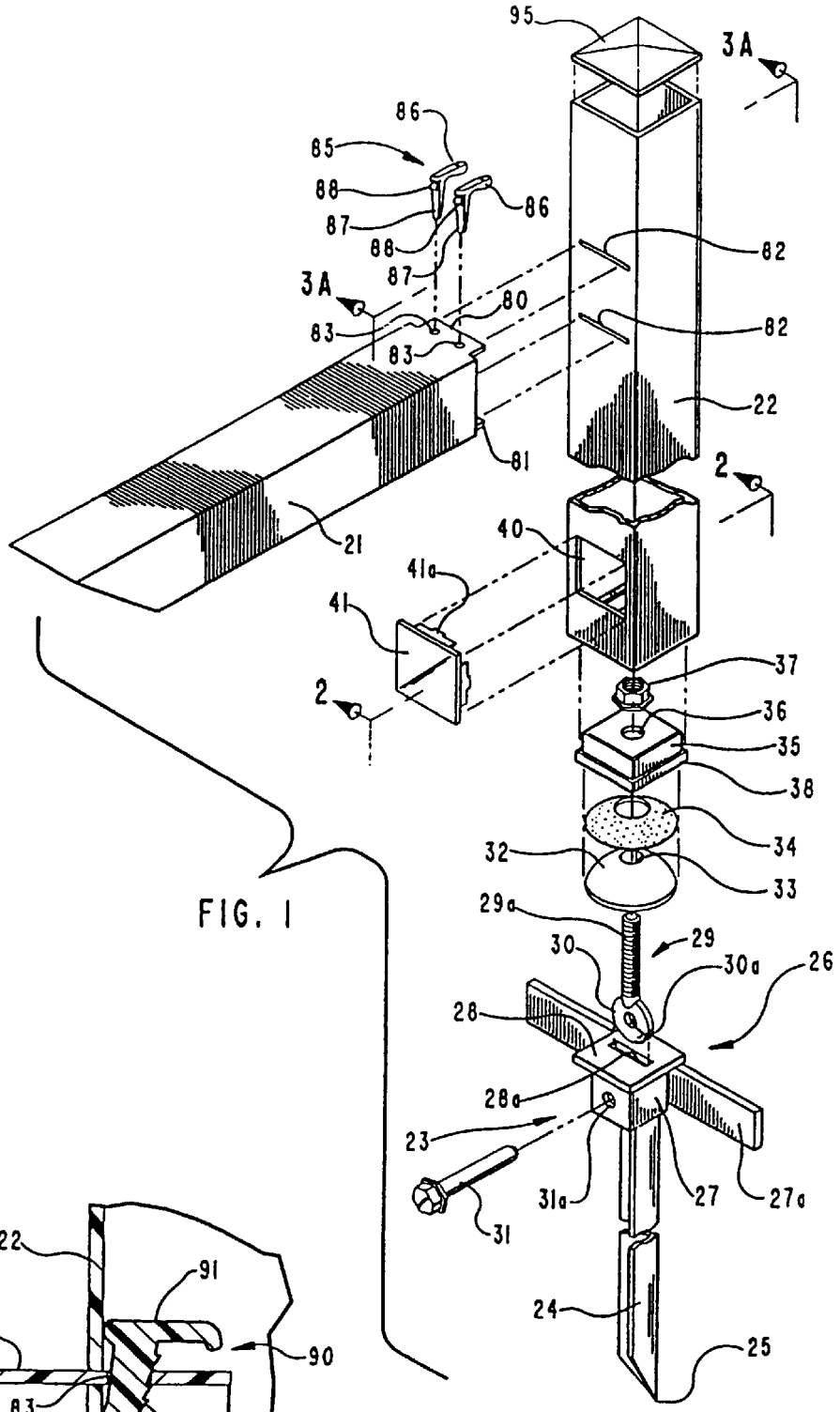
FIG. 1 shows an exploded side elevation perspective view of one embodiment of an adjustable mounting for a post system of the present invention shown as a ball segment and seat maintained to a ground stake and a tube cantilever mounted to an upper end thereof.
Figure 2:
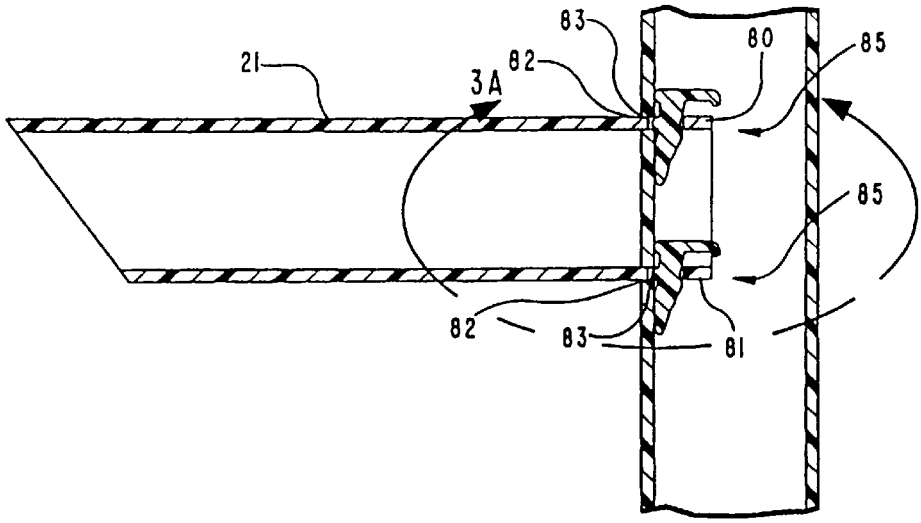
FIG. 2 shows a side elevation sectional view of an upper post portion and tube of FIG. 1.

The present invention is in a post system that includes a number of novel and unique elements. FIG. 1 shows an exploded profile perspective view of one arrangement of post system 20, hereinafter referred to as system. In FIGS. 1 and 2, the system 20 is shown used for mounting a mail or newspaper tube 21, hereinafter referred to as tube, cantilevered out from the side of a post 22. Which post 22, its ground mounting arrangements and fastener components, as set out hereinbelow, are also useful for mounting a mail box as shown in FIGS. 10 through 12, and 17 through 19. Though, of course, the system 20 and the other embodiments therein could be utilized as a post alone, for example a fence post, or could be used for mounting any item, within the scope of this disclosure.

*As thus shown in FIGS. 1 and 2 and as indicated by the descriptions herein, the post 22 is an outdoor-mountable post configured and adapted for supporting outdoor lateral loads such as loads imposed when the newspaper tube 21, or a section of fencing, or any other structural member, becomes fixedly attached to the post 22 and extends laterally outward and sideways from the post 22.*

Figure 8:
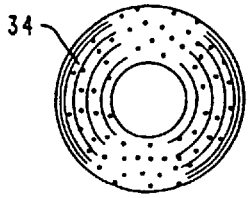
FIG. 8 shows a top plan view of a friction gasket for arrangement between the surfaces of the ball and seat segment of FIG. 7.

The system 20 of FIG. 1 includes a ground stake 23, shown as a section of angle iron 24 that is pointed at a lower end 25. The upper or top end of which angle iron section includes a cap 26 fixed thereover that is formed as a square tube with walls 27 with a flat plate 28 arranged thereover. The angle iron section 24 top end is telescoped into which square tube, one of which tube walls includes a bar 27a secured thereacross to present an anchor that binds into the ground wherein the ground stake is driven, inhibiting ground stake movement and withdrawal, as set out below. The flat plate 28 that is arranged across the square tube top end is shown as including a keyhole 28a, that allows an eye bolt 29 head end 30 to be fitted therethrough. Which head end 30 is holed at 30a to receive a bolt 31 fitted through a hole 31a formed in tube wall 27 and secured in the opposite tube wall. The eye bolt 29 is thereby secured to the square tube 26, a threaded end extending at a right angle upwardly from the flat plate 28. Shown in FIG. 1, the eye bolt 29 threaded end 29a is fitted through an open center portion or hole 33 of a ball segment 32. Which opening or hole 33 is tapered outwardly from a lesser diameter bottom end to a greater diameter top end, the bolt threaded end 29a thereby being free to swing across which hole 33 top end. The eye bolt 29 threaded end 29a is fitted thorough a gasket 34 that preferable has a like surface area to the ball segment 32 surface, as shown also in the top plan view of FIG. 8.

Figure 4:
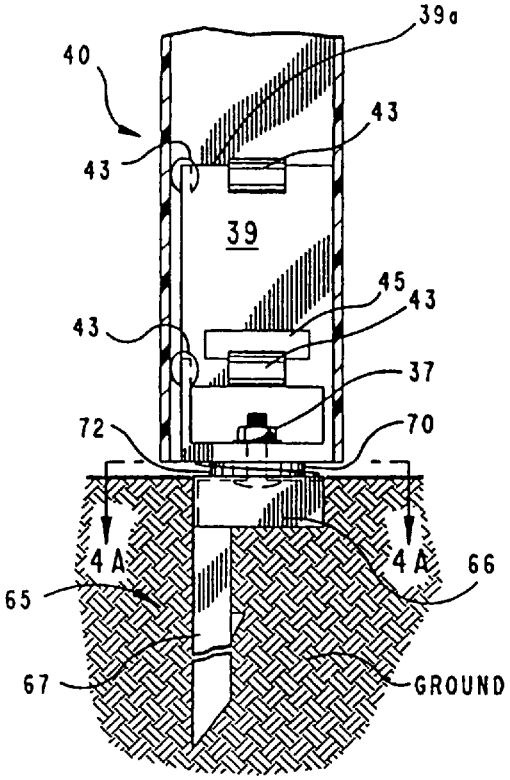
FIG. 4 shows a side elevation sectional view of another ground stake, post insert with post segment showing another embodiment of an adjustable post to ground stake mounting of the present invention shown as a pair of tapered washers that are positionable relative to one another into a stack, the washer relative positioning to one another providing a tilt to the vertical of the post insert.
Figure 5:
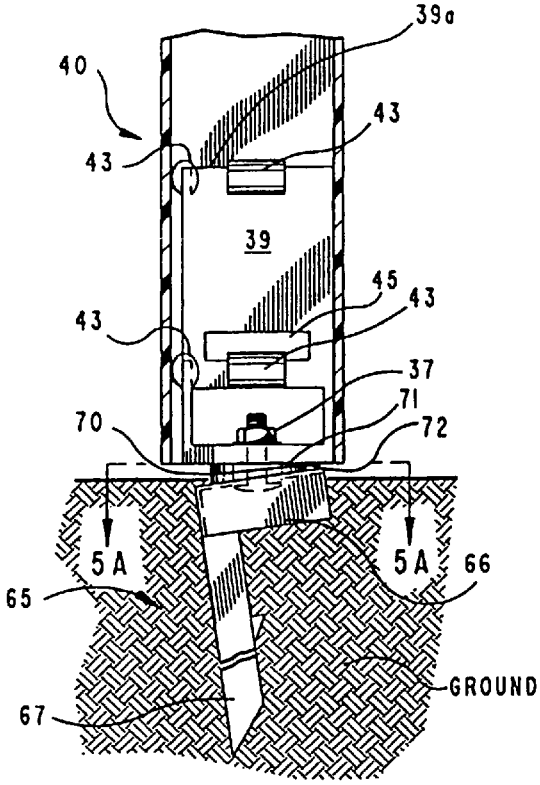
FIG. 5 shows a side elevation sectional view like that of FIG. 4 except that the ground anchor is shown tilted from the vertical, which tilt is shown corrected by the alignment of the tapered washers tabs, that provides a tilt to the washer stack, whereby the connected post is aligned to the vertical.
Figure 6:
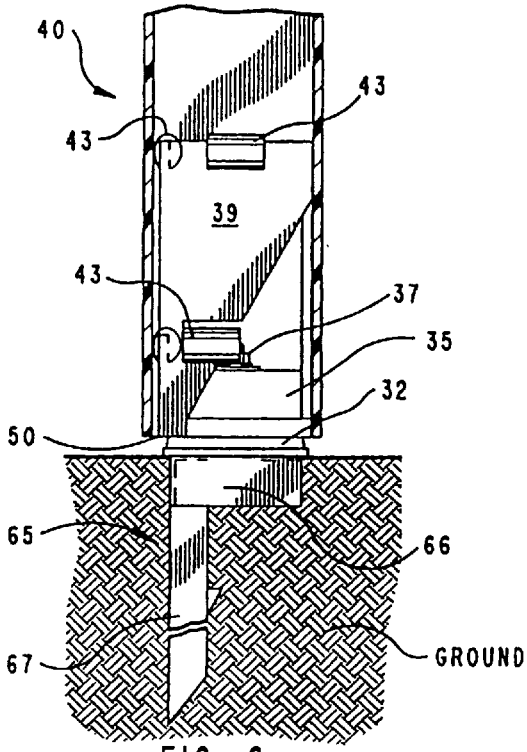
FIG. 6 shows a view like that of FIG. 4 except that a ball segment and seat mount like that of FIG. 1 is shown arranged between the ground anchor top and post insert bottom surfaces.
Figure 7:
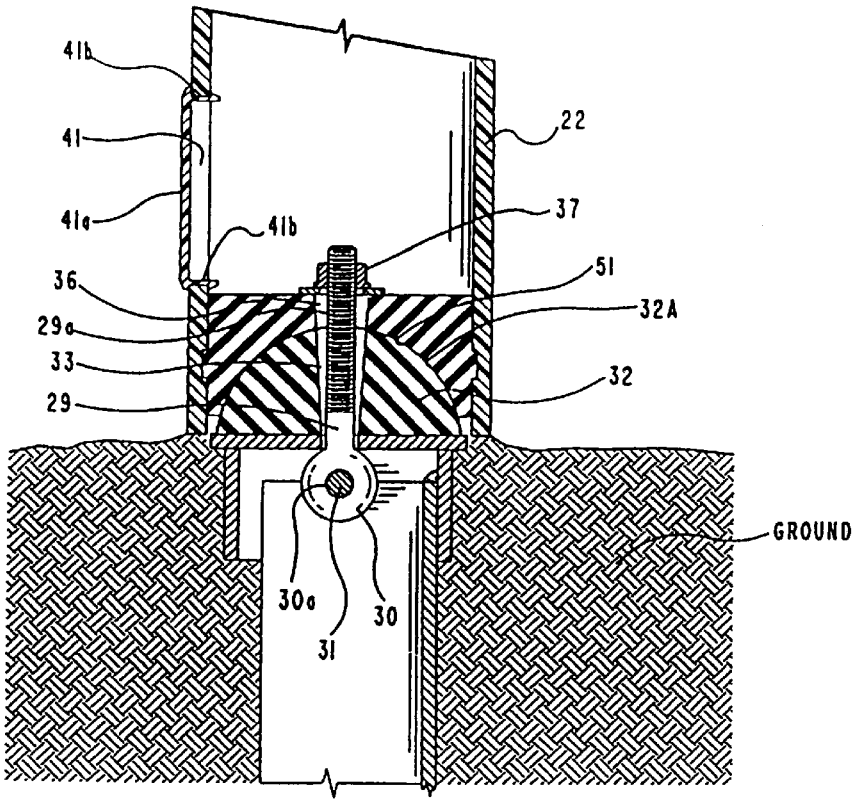
FIG. 7 shows an enlarged profile sectional view taken along the line 7—7 of FIG. 6 of the ball and seat segment mounting.
Figure 7A:
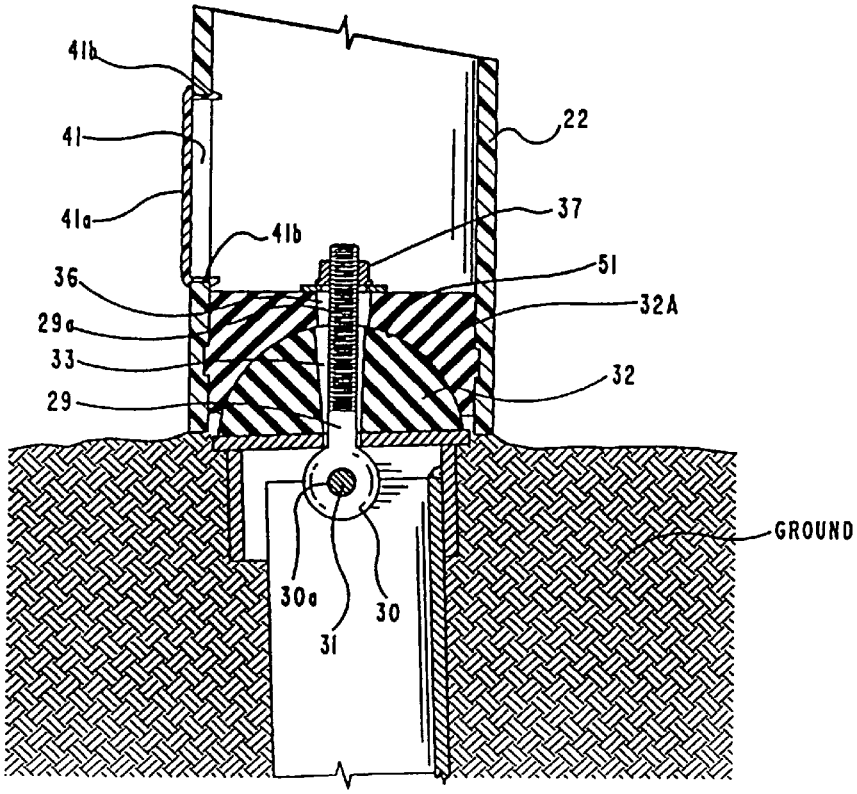
FIG. 7A shows a view like that of FIG. 7 except the seat is show moved out of center with the ball segment for aligning a connected post to the vertical.

Shown in FIGS. 1, 7 and 7A the eye bolt 29 threaded end 29a is for fitting through an adjustable mount that consists of ball segment 32 with tapered hole 33 and gasket 34 and a square post mount 35 containing a seat. The square post mount includes a center hole 36 that eye bolt 29 threaded end 29a is fitted through with a washered nut 37 turned thereover. The washered nut 37 turned on the eye bolt 29 couples the ball section 32 and seat together with gasket 34 therebetween providing a capability for adjusting the attitude to the vertical of a post 40 secured onto which square post mount 35, as set out hereinbelow. In another mounting embodiment, as shown in FIGS. 4 and 5, as well as the ball segment and seat mounting embodiment of FIG. 6, a post insert 39 is utilized for receiving post 39 telescoped thereover.

Shown in FIGS. 1, 7, 7A, 13 and 16, the post 22 is for telescoping over the square post mount 35, resting on a lip 38 formed around a lower edge of which mount, the post preferably secured thereon as by gluing, with a snap-in arrangement, or the like, in a manufacturing setting. For attaching the square post mount 35 onto the ball segment 32, the eye bolt threaded end 29a is fitted through the center hole 36, extending into the post 22. So arranged, an operator, not shown, positions the post 22 to a desired attitude to the vertical and fits the washer nut 37 through a portal 40 formed through the post side and onto the eye bolt threaded end 29a. He then turns and tightens that washer nut 37 onto the eye bolt threaded end 29a, compressing a seat 51 formed in the undersurface of which square post mount 35 tightly against the ball segment 32 surface, sandwiching gasket 34 therebetween, and locking the post 22 square post mount end in place with the ball segment 32. Which gasket 34 is formed of a course material to provide a non-slip surface between which ball segment surface and seat coupling. Thereafter, a window 41 having shoulders 41a is snapped into to cover over portal 40, completing mounting.

Figure 1A:
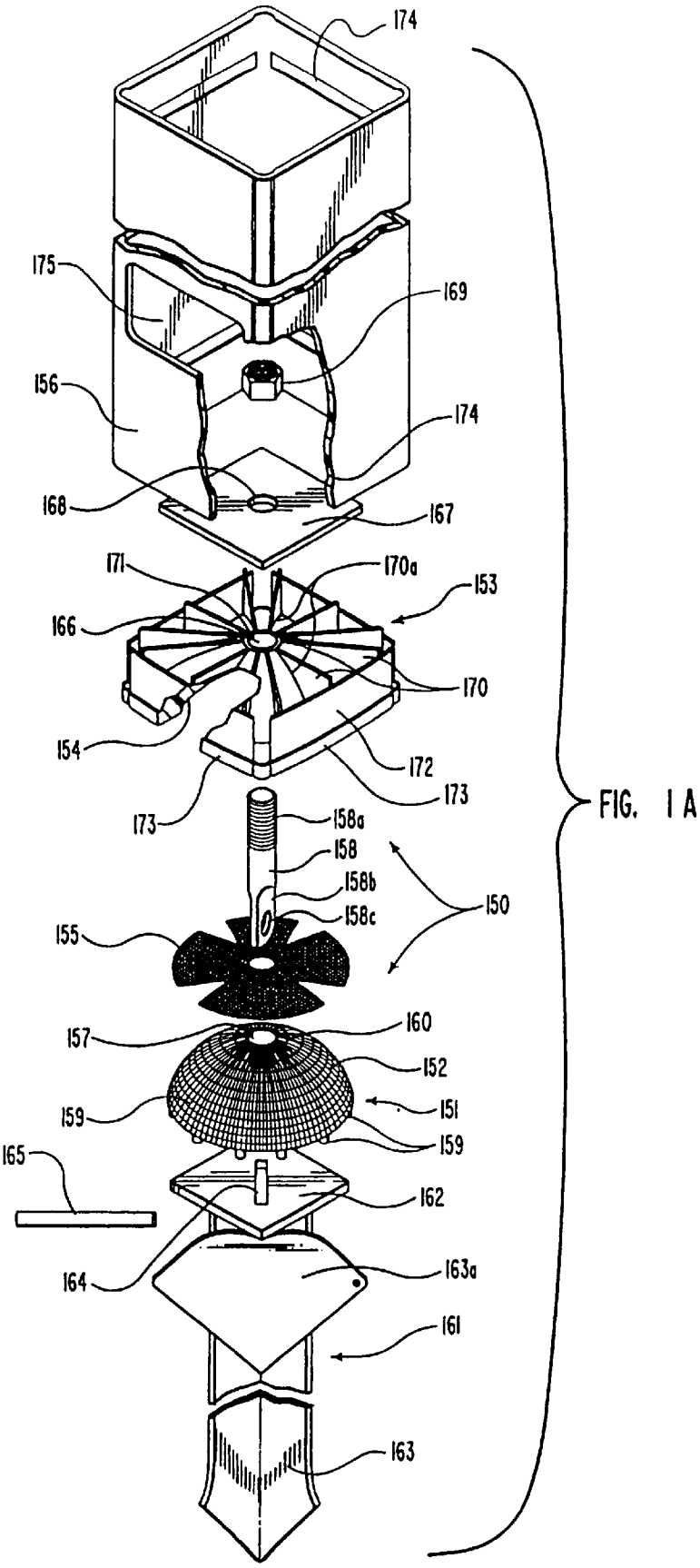
FIG. 1A is an exploded side elevation perspective view like that of FIG. 1, showing another embodiment of an adjustable mounting for a post system of the present invention as including a ball segment and seat maintained to a ground stake and supporting a post thereto, which post is shown with a mid-section removed therefrom.

FIG. 1A shows an exploded view of another embodiment of an adjustable mounting 150 that, like the embodiment of FIG. 1, includes a ball section 151 that may have a smooth or grooved outer surface 152. The ball section is for fitting into a seat 153 that has a hemispherical surface 154 to accommodate the ball section fitting snugly thereagainst and, like the ball section, may be smooth or scored, for promoting a binding between the engaged surfaces when they are clamped together. To further promote which binding, a washer 155, can be positioned between the ball section and seat surfaces. Such washer 155 is preferably formed of an abrasive material. It may be formed as a complete circle or may be a circle that has had sections removed therefrom, as shown. Like the ball section and seat combination of FIG. 1, the seat 153 is positionable to ball section 151 to provide for movement therebetween for adjusting the vertical positioning of a post 156, shown as a hollow square tube, that the seat is mounted to in a lower end thereof.

Shown best in FIG. 1A, the ball section 151 is preferably a hemisphere whose outer surface 152 is score thereover and includes a center hole 157 that is to receive a threaded end 158a of a bolt 158 fitted therethrough. The ball section 151, as shown, is preferably formed of plastic and includes a number of equal spaced curved ribs 159, that connect to an apex ring 160 that hole 157 is formed through the center of.

The underside of the ribs 159 are for positioning on a top surface of a top plate 162 shown mounted across a top end of a ground stake 161. The ground stake has a blade 163 as a lower end thereof that, like the angle iron 24 of FIG. 1, is for driving into the ground, an angle plate 163a thereof slicing into the ground, securing the ground stake in the ground.

For positioning the ball section 151 onto the top plate 162 a slot 164 is formed on the bias across and through the top surface that is to receive a flattened end 158b of bolt 158 that has a hole 158c formed therethrough. With the bolt flattened end 158b fitted through slot 164, a pin 165 can be fitted through the bolt hole 158c, prohibiting bolt withdrawal with the bolt threaded end 158a extending out from the top of ball section 151.

Figure 1B:
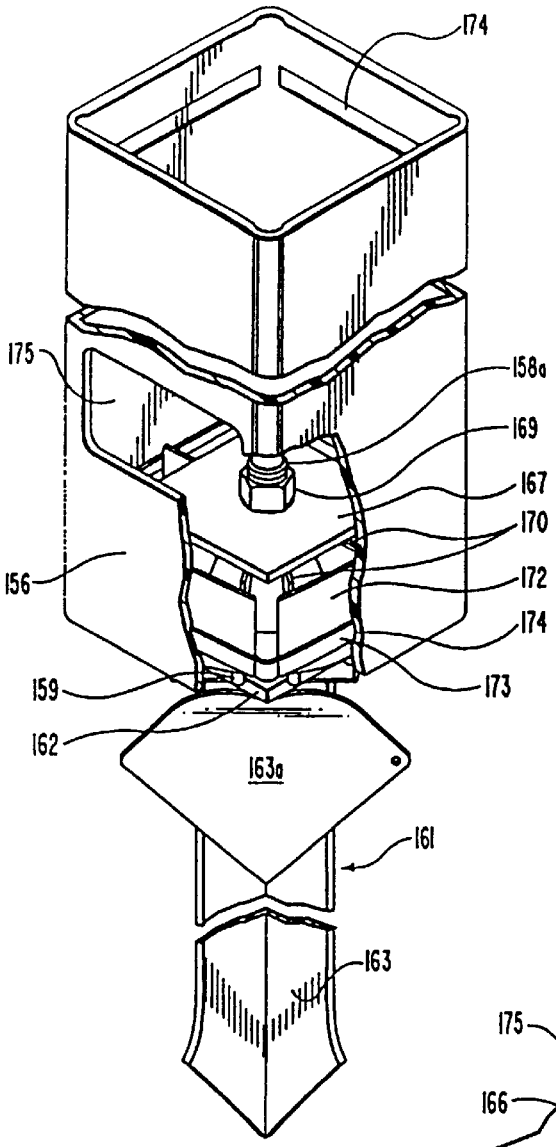
FIG. 1B shows an assembled view of the adjustable mounting, ground stake, and post of FIG. 1A.

To mount the ball section 151 and seat 153 together the bolt threaded end 158a is arranged to fit through a center hole 166 of seat 153 and through a center hole 168 of a washer plate 167 and to receive a nut 169 turned thereover. Like the ball section 151, the seat body, as shown, is preferably formed of plastic and includes a number of spaced apart ribs 170 extending radially from a ring 171 wherethrough the hole 166 is formed. The ribs include curved surfaces 170a for supporting the seat 154 that, like ball section surface 152, may also be scored, or the like, to increase surface friction. Side walls 172 are provided across the rib 170 ends, and an outstanding ridge 173 is formed around the seat body 153, below the lower edges of side walls 172. To couple the seat 153 into the post 156 end, the seat body, with the seat surface 154 facing out of the post end, is urged into the open post end until the seat body ridge 173 slides into a slot 174 that has been formed around the post interior, adjacent to the post end. Shown in FIGS. 1A–1C, for convenience, both post ends are shown as including inner slot 174 formed therein. The seat ridge 173 when urged into the post end tends to flex inwardly, contracting upon itself, and upon entering the post slot 174, will immediately expand into that slot, locking the seat 174 in and across the post end. Access to the post interior is provided through a port 175 formed in the post side, above slot 174 to allow nut 169 to be turned onto the bolt threaded end 158a, clamping the ball section 151 and seat 153 together, as shown in FIG. 1B. Whereafter a cover, like the window 41 of FIG. 1, can be installed over the port 175.

To provide for adjusting the position of the seat 153 on the ball section surface 152, the bolt 158 coupling of pin 165 is intentionally loose to allow for movement of the bolt threaded end 158a across that coupling, which movement is provided for by the formation of the ball section hole 157 to allow a loose fit of the bolt 158 fitted therethrough. Accordingly, the bolt 158 can be tilted from the vertical, and that tilt will be reflected in the positioning of the seat 155 fitted thereto that is, in turn, translated to post 156. So arranged, the post can be positioned to the ground stake so as to compensate for an angle that the stake 161 is driven into the ground and for ground conditions, to mount the post 156 at a desired attitude. In practice, the adjustable mount of the invention allows for up to twenty (20) degrees of change in vertical attitude of post 156 to the ground surface whereto the ball section 151 is maintained.

Figure 1C:
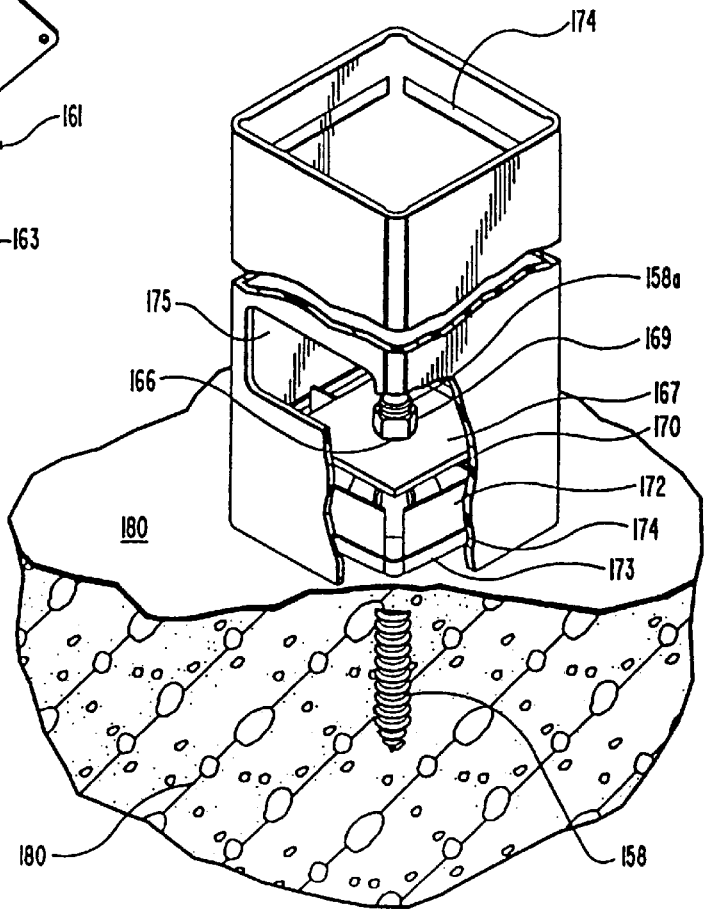
FIG. 1C shows an assembled view of the adjustable mounting of FIGS. 1A and 1B, and showing the seat mounted directly onto a flat concrete surface.

FIG. 1B shows the assembled adjustable mount 150, and FIG. 1C shows the seat 153 directly secured and rigidly mounted by bolt 158 to a top surface of a concrete slab, supporting post 156 mounted thereto. Which arrangement does not allow for adjustment of the angle of the post that is seated on and at approximately a right angle to the concrete surface. In this arrangement the bolt 158 lower end 158d is anchored in the slab of concrete 180, the bolt threaded end 158a extending outwardly therefrom to fit through the center hole 166. The seat 153, in turn, is mounted in the open end of post 156, and passes through hole 168 in washer plate 167, to receive the nut 169 turned thereover, rigidly mounting the post 156 onto the top surface of cement slab 180.

*The seat 153, as referenced in FIG. 1A and shown also in FIGS. 1B–1C, is thus an insertable member that is "concavo-convex" in shape as shown in those drawings, in accordance with the usual meaning of the term "concavo-convex" which generally refers to an item that is concave on one side and convex on the other.*

Figure 4A:
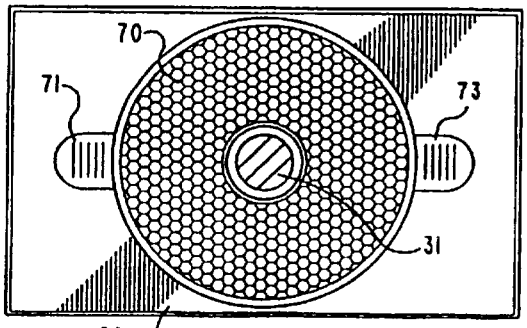
FIG. 4A shows a top plan sectional view of the top of the pair of tapered washers of FIG. 4 with tabs of which washers, that extend from a narrowest portion of each washer edge, extending oppositely.
Figure 5A:
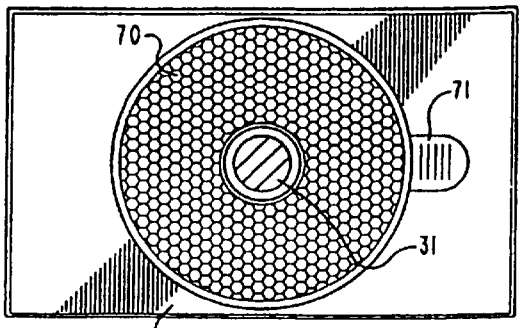
FIG. 5A shows a top plan sectional view that is like that of FIG. 4A except that the tapered washer tabs are shown aligned over one another.

FIGS. 4 and 5, show another post 22 mounting embodiment that includes a post insert 39 that is a square open tube that utilizes a tapered washer stack, shown also in FIGS. 4A and 5A, as the post 22 mount rather than the ball segment and seat embodiment, as discussed above. The post insert 39, like the post mount 35, is to receive the post 22 telescoped thereover, as set out and discussed hereinbelow. Further, it should be understood, other post mounts and tubes and tube configurations, such as round, could be so used within the scope of this disclosure.

Figure 9:
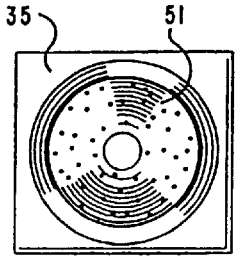
FIG. 9 shows a top plan view of a washer for fitting between the top of the seat segment and the bottom surface of which post insert seat of the adjustable mounting.

Shown best in FIGS. 7 and 7A, the ball segment seat 51 formed across the undersurface of the square post mount 35 of FIG. 1 is hemispherical in shape to conform to the surface of the ball segment 32. This seat 51 is also shown with the square post mount 35 of FIG. 6 and in the bottom plan view of FIG. 9. Further, it should be understood, where the ball segment seat 51 is set out above as formed in the square post mount 35 or across a lower end of the post insert 39, that seat can also be formed across a lower end of the post 22 itself, within the scope of this disclosure. Which post mounts of FIGS. 6, 7, 7A and 16, do not include the gasket 34, but instead employ a roughening at 32a of the ball segment surface to provide a friction surface therebetween, that is shown best in FIG. 16. A ball segment and seat coupling is thereby provided that allows the post 22 to be tilted across the ball segment 32 surface, as illustrated best in FIGS. 7 and 7A, for adjusting the post attitude relative to the top surface 28 of the ground stake 23.

FIGS. 4, 5 and 6, as set out above, utilize a post insert 39 that is adjusted to the vertical for receiving the post 22 end telescoped thereover. To maintain a secure coupling of which post insert 39 and post 40 end, spacers 43 are arranged between opposing surfaces of which post insert and post. Which spacers 43 are preferably each a saddle having a center slot with parallel legs thereacross and are formed from a resilient material. The spacers 43 are fitted, as shown in FIGS. 4, 5 and 6, across the post insert top edge 39a and across a top edge of a slot 45, or slots 45, that are formed in the side of which post insert. Two points of spacers 43 contact with the post 22 interior walls are thereby provided for preventing movement of the post 22 relative to the post insert 39.

Figure 13:
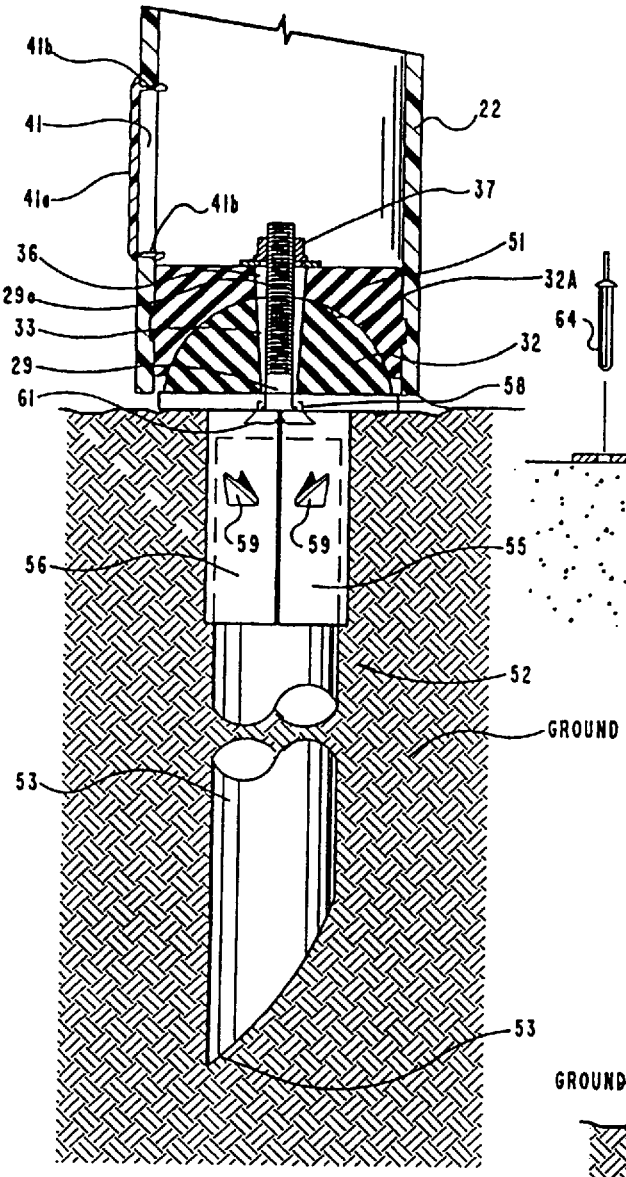
FIG. 13 shows a side elevation view of another embodiment of a ground anchor and a side elevation sectional view of a post insert and post section secured thereto by another variation of a ball segment and seat adjustable mounting of the present invention.
Figure 15:
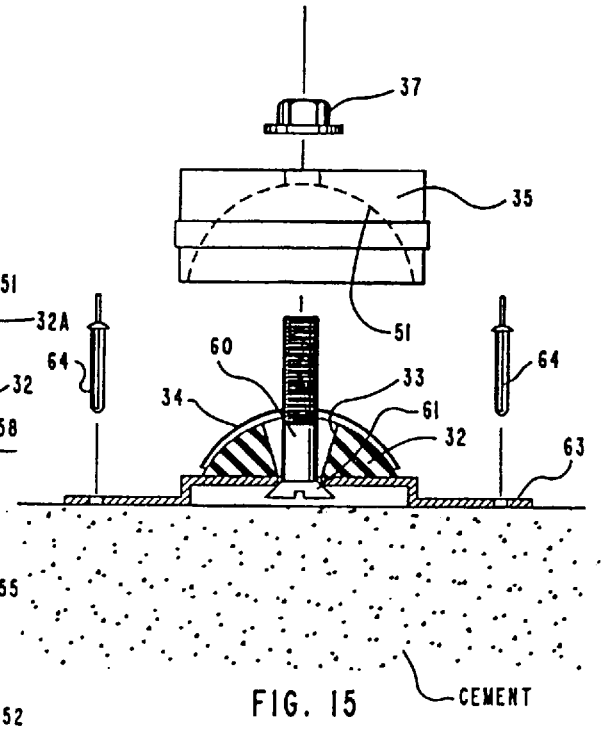
FIG. 15 shows an exploded view of a ball segment and seat adjustable mounting that is like that of FIG. 14 except that it is shown for use with a concrete mounted base plate.
Figure 16:
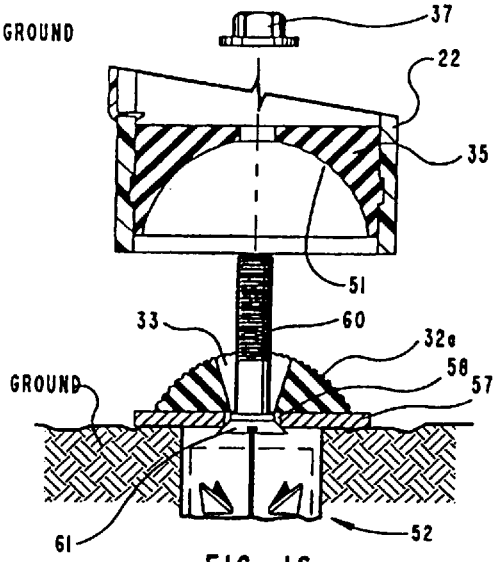
FIG. 16 shows an exploded view of the ball segment and seat adjustable mounting of FIG. 13.

As set out above, the embodiments of the invention shown in FIGS. 1, 6, 7 and 7A, as do the adjustable mountings shown in FIGS. 13, 15, and 16, all employ variations of ball segment and seat mountings between the ground stake and post mount or post insert. The ball and seat arrangement of FIG. 1, and as shown in FIGS. 7 and 7A, is a ball segment 32 for fitting it in a hemispherical seat 51 of the square post insert 35. A gasket 34 is shown sandwiched between which ball segment and seat in FIG. 1 and the ball segment surface is shown roughened at 32a in FIGS. 7 and 7A, for prohibiting relative movement or slippage of the mount components when they are clamped together.

Functionally, the ball segment and seat arrangements of FIGS. 1, 6, 7 and 7A, are alike, as are the ball and seat arrangements of FIGS. 13, 15 and 16. Except that the mountings of FIGS. 1, 6, 13 and 15 include gasket 34, while the mountings of FIGS. 7, 7A, and 16, show as a roughened surface 32a included on the ball segment 32 surface.

FIGS. 13 and 16, involve a tubular or cylindrical ground stake 52, shown best in FIG. 13 as a cylinder 53, that includes a pointed lower end 54. The upper or top end of which cylinder includes a cap 55 that is formed as a square tube with walls 56 and with a flat plate 57 arranged thereover. The cylinder 53 top end is telescoped into and secured in which square tube 55, the flat plate 57 closing off the tube end. Which flat plate 57 has a hole 58 formed therethrough that is counter sunk on the flat plate undersurface to receive a tapered undersurface of a the head 61 of a flat head bolt 60 that is fitted therethrough. Which bolt 60 functions like the described eye bolt 29 except, of course, it relies on a frictional engagement between the countersunk portion of hole 58 and head 61 undersurface to allow a washer nut 37 to be tightened thereover. Otherwise the functioning of which eye bolt 29 and bolt 60 should be taken as being the same.

As shown in FIGS. 13 and 16, the cylinder 53 is to be driven into the ground, pointed end first, as a ground anchor. For further anchoring which cylinder 53, each square tube wall 56 includes a tab 59 cut therein, that cut section then bent outwardly to present an edge to engage and bind into the ground wherein the ground stake is driven, inhibiting its withdrawal.

FIG. 15, shows another post 22 mounting that includes the ball segment 32 secured onto a top surface of a bracket 63 that has a raised center portion and planar sides that are holed for receiving cement fasteners 64 fitted therethrough and driven into a cement, concrete, or like surface, securing the bracket thereto. Which bracket 63 raised center portion is center holed to receive the bolt 60 fitted therethrough prior to mounting. While the bolt head 61 is shown for receiving a screw driver blade, it should be understood that a hex shaped head could be so used as head 61 that would accommodate a wrench head fitted under the bracket 63, to hold that head while the washer nut 37 is turned onto the bolt 60 threaded end.

As set out above the open center portion or hole 33 through the ball segment 32 is tapered from a lesser diameter at its base to a greater diameter at its top, to allow for tilting of bolt 31. Which angle of taper, as shown as angle A in FIGS. 7, 7A and 13; as set out hereinabove, allows for a change in angle of the angle of post 22 of up to twenty (20) degrees from a right angle to the ground. Preferably; the hole tapers to provide up to a twenty degrees (20°) change of the post longitudinal axis so as to provide an angle of tilt to the attached post of up to ten degrees (10°) either side of a right angle to the plane of the ground or top surface of a ground stake. This tilting capability allows for positioning the post 22 or post insert 39 back to the vertical so as to compensate for the ground stake the top surface not being horizontal.

FIGS. 4 through 6, show another embodiment of a ground stake 65 that includes a platform 66 and pointed stake 67, which stake is shown as having been pounded into the ground. FIG. 5 shows the stake 67 as having displaced from the vertical in that driving, necessitating a tipping of the post insert 39 to compensate to position the post 22 telescoped thereon to the vertical.

Hereinabove have been set out a number of ball segment and seat configurations for attaching a post insert 39 onto the top of a ground stake to allow for a tilt of that post insert to where it is in a vertical attitude. FIGS. 4, 4A, 5 and 5A, show another post insert mounting arrangement that also allows for tilting of the post insert 39. As shown, this tilting arrangement consists of a pair of tapered washers 70 and 72, that overlay one another forming a stack. In FIG. 4 the washers 70 and 72 tapered surfaces are shown to slope oppositely, with the top and bottom surfaces of which stack thereby being essentially parallel. To provide for washer positioning each washer includes a tab 71 and 73, respectively, that extends outwardly from the thinnest washer side. Shown in FIG. 4A the tab 71 of the washer 70 extends from one side of the stack, with the tab 73 of the washer 72 shown extending outwardly from the other stack side, indicating that the washer tapered surfaces slope oppositely. So arranged, the washer stack would have essentially parallel top and bottom surfaces. FIG. 5A shows the tapered washers 70 and 72 as having been turned to where the tabs 71 and 73 align, the tapers overlay one another, providing a tilt to the stack top surface relative to the bottom, as shown in FIG. 5. This tilt, as shown, is to compensate for the positioning of the ground stake pointed stake 67 being at other than the vertical. Functionally, with the tapered washers 70 and 72 positioned to provide a desired angle to the post insert 39, the washer nut 37 is turned onto the bolt, whereafter the post 22 is installed onto the post insert 39, as described above.

Figure 10:
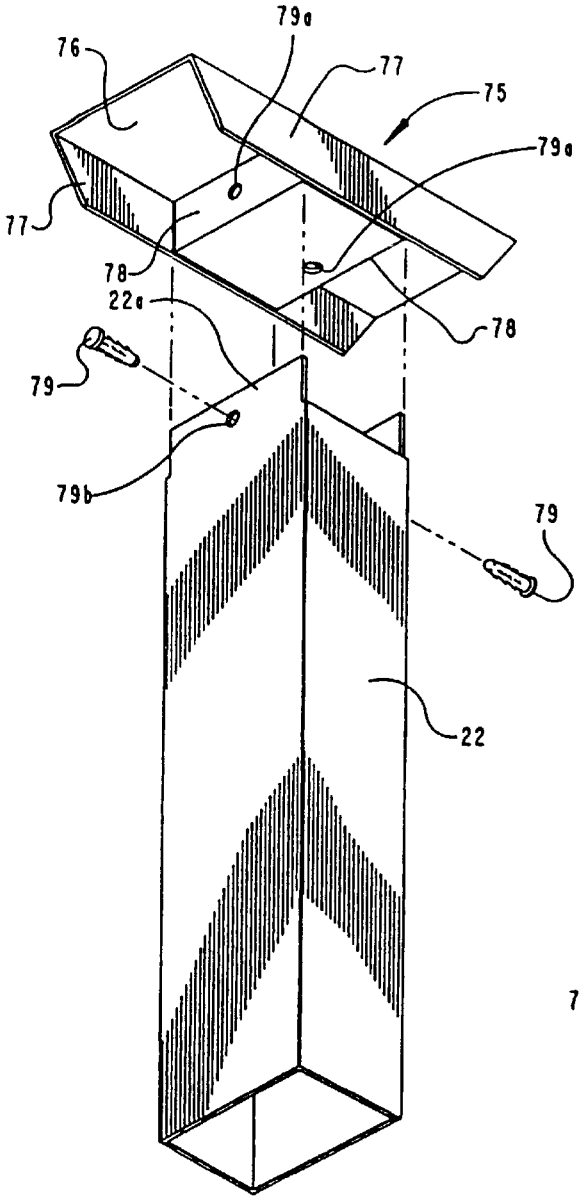
FIG. 10 shows a profile perspective view of an upper section of the post of FIG. 1, the top end thereof shown aligned for receiving a first embodiment of a mail box mount thereon.
Figure 11:
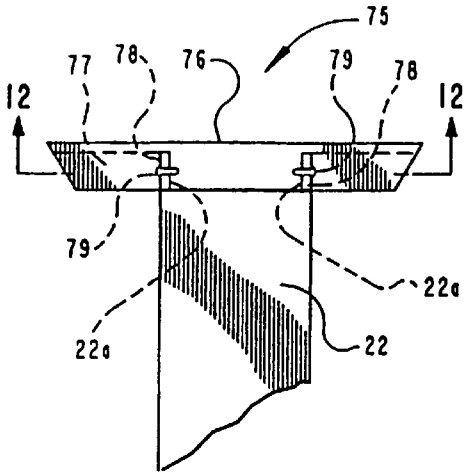
FIG. 11 shows a side elevation sectional view of the assembled post top end and mail box mount of FIG. 10.
Figure 12:
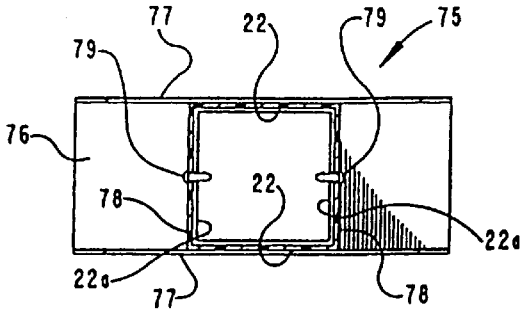
FIG. 12 shows a top plan sectional view taken along the line 12—12 of FIG. 11.
Figure 17:
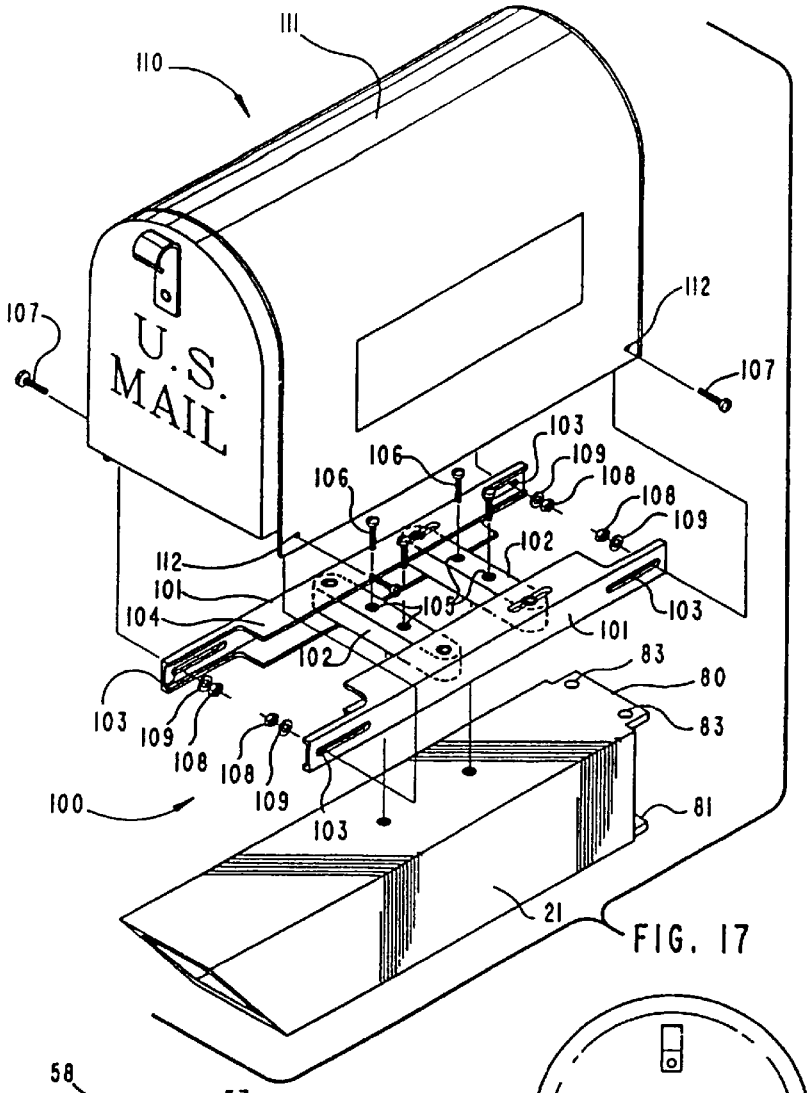
FIG. 17 shows an exploded side elevation perspective view of a mail box, a frame mount and cantilevered tube of the present invention.
Figure 14:
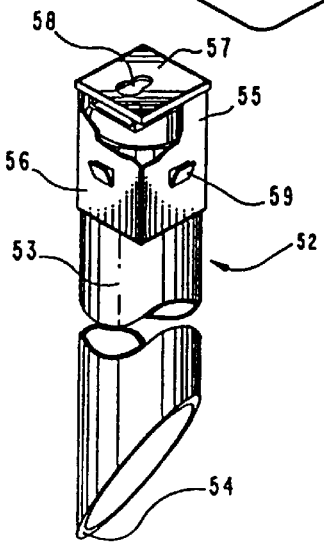
FIG. 14 shows a side elevation perspective view of the tubular ground anchor of FIG. 13.
Figure 18:
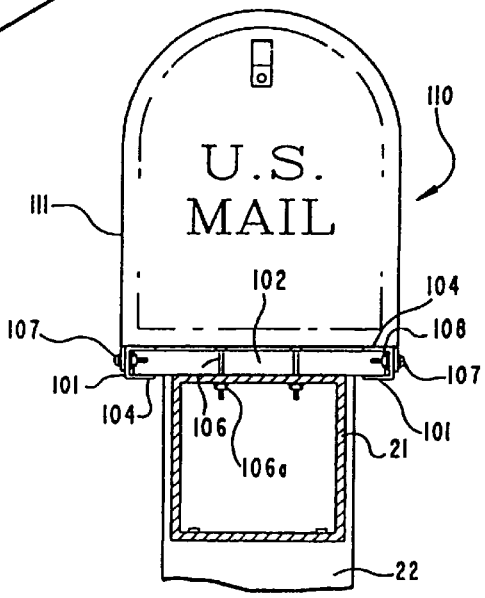
FIG. 18 shows an end view of the mail box, frame mount and cantilevered tube of FIG. 17 in their connected attitude mounted to a post.
Figure 19:
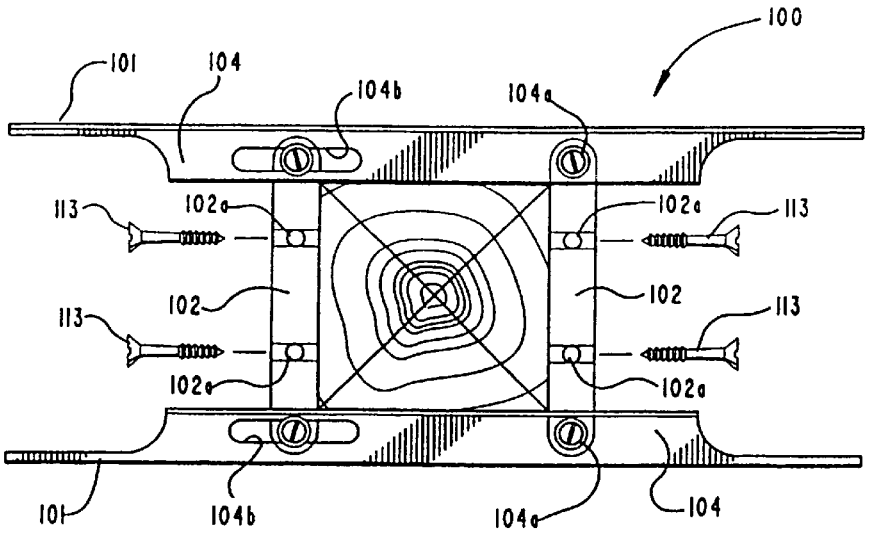
FIG. 19 shows a top plan view of a frame mount like that of FIGS. 17 and 18, except the frame of this embodiment is adjustable and is arranged for mounting a mail box onto a top end of a wood post by screws turned through mount bars and directly into top of a wood post.
Figure 20:
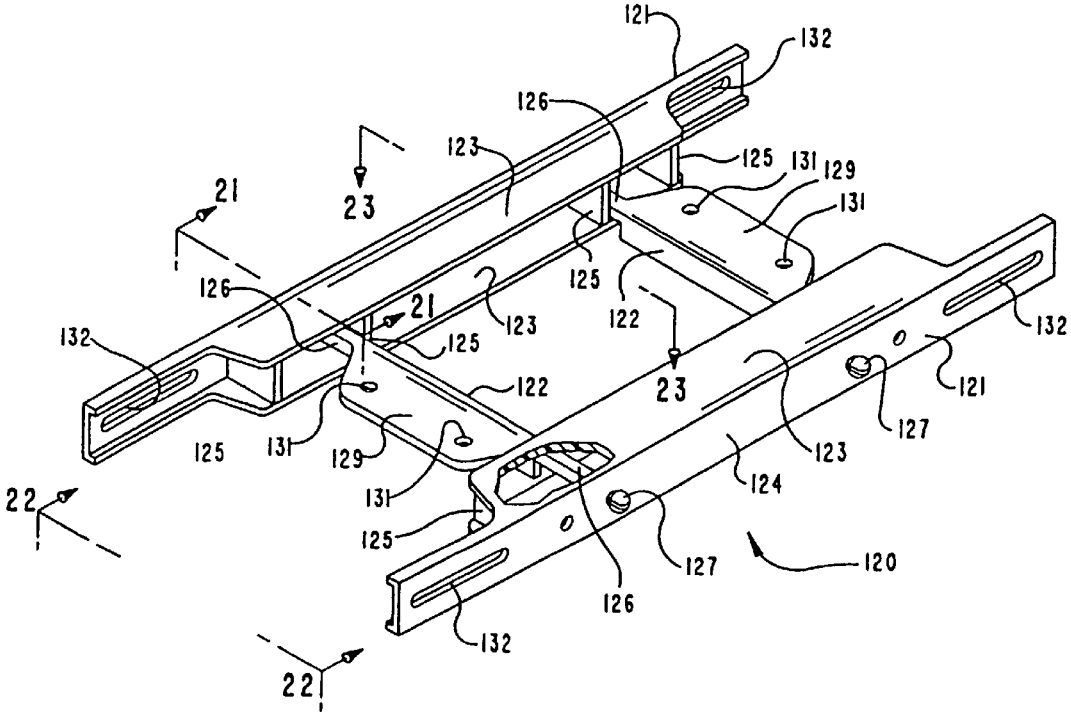
FIG. 20 shows a profile perspective view of an adjustable mail box mount of the present invention.

The post 22 mounted to the post mount 35 or is telescoped over the post insert 39 is then useful for: mounting a newspaper tube 21 cantilevered outwardly from the post top end, as shown in FIGS. 1 and 2; mounting a mail box mount 75 across a top post end, as shown in FIGS. 10 through 12, to receive a mail box thereon; mounting mail box across the post 22 top end by a frame mount, as shown in FIGS. 19, 20, 23 and 24; mounting a newspaper tube 21 cantilevered from the post 22 top end that, in turn, mounts a mail box as shown in FIGS. 17 and 18, or mounting a mail box onto a horizontal wood beam, as shown in FIG. 20.

The newspaper tube 21, shown in FIGS. 1 and 2, is preferably an open tube or hollow, the top and bottom sides of which tube at one end, are formed into outwardly extending top and bottom end tabs 80 and 81, respectively. The end tabs 80 and 81 are each for fitting in one of parallel lateral slots 82 formed across a post 22 side, and each end tab 80 and 81 has at least one, and preferably two holes 83 formed therethrough. To install the newspaper tube 21 cantilevered from the post 22 pegs 85 are passed through the post 22 top end and are individually fitted through the end tabs 80 and 81 holes 83. This operation is preferably performed manually and accordingly the pegs 85 are preferably formed from a molded material, such as a plastic, and are configured for ease of installation. FIGS. 1, 2 and 3C show a first peg 85 embodiment that includes a broad head 86 and tapered body 87. A locking ridge 88 is shown extending outwardly from the peg body 87, opposite to broad head 86. Which locking ridge 88, with peg insertion into an end tab hole 83, as shown best in FIG. 3C, extends into the post lateral slot 82, for preventing peg withdrawal.

Figure 3B:
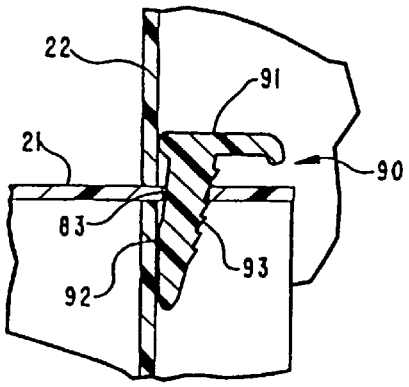
FIG. 3B shows an enlarged side elevation view of a peg of FIGS. 2 and 3A taken within the line 3B—3B of FIG. 3A.
Figure 3A:
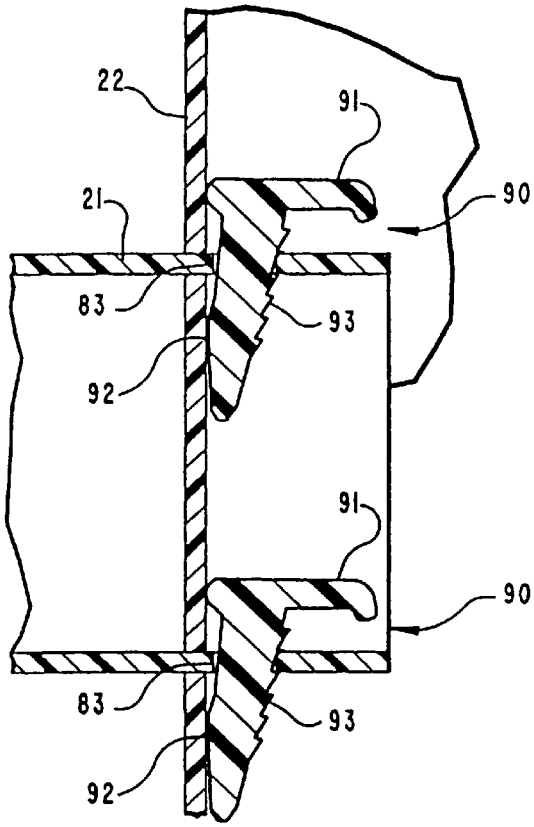
FIG. 3A shows a side elevational sectional view taken within the line 3—3 of FIG. 2.
Figure 3C:
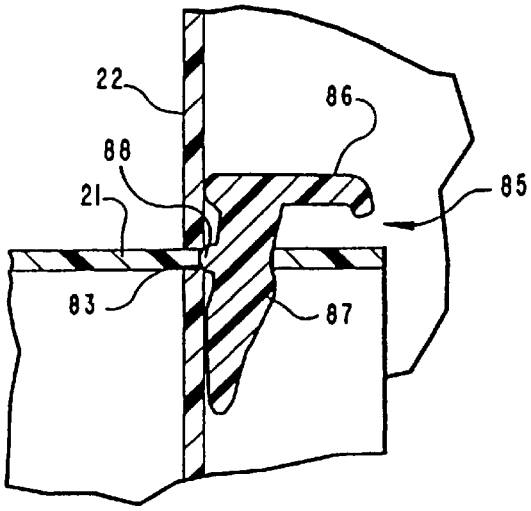
FIG. 3C shows a view like that of FIG. 3B only showing another peg embodiment.

A second peg 90 embodiment is shown in FIGS. 3A and 3B. The peg 90, like the described peg 85, has a broad head 91 and includes a tapered body 92. Rather than a locking ridge, however, the peg 90 includes spaced teeth, serrations, barbs, or threads 93 that are formed along and to extend outwardly from the tapered body 92, below the broad head 90. Shown best in FIG. 3B, with the peg 90 installed in hole 83, a side of one or more of the teeth, serrations, barbs, or threads 93 will engage the tab hole 83 edge, prohibiting peg withdrawal.

A cap 95, shown in FIGS. 1 and 2, is preferably installed onto, to cover, the post 22 open top end. Prior to which cap 95 installation the pegs, as described, are fitted through that post open end and into the tab holes 83. Which cap 95, shown in FIGS. 10 through 12, is replaced by mail box mount 75, or a mail box mounted thereon. Which mail box mount 75 consists of a flat top plate 76 that has downwardly extending right angle flanges 77 that project from along opposite edges. Equidistantly spaced plates 78 are secured across which downturned flanges 77, the flanges and plates thereby forming a square center recess that is for receiving a square post 22 end fitted therein. For providing overlying coupling surfaces where the flanges intersect the post surfaces, opposite side end sections of which post 22 may be removed leaving tabs 79. Shown best in FIGS. 11 and 12, the tabs 79 and plates 78 are to be fitted together in juxtaposition arrangement with holes 79a through each aligned to receive pins 79b fitted therein securing the mail box mount 75 onto the post 22 end. So arranged, the flat top plate 76 is for receiving a mail box secured thereon.

FIGS. 17 and 18 show another mounting 100 for a mail box 110. The mounting 100 includes a pair of brackets 101 that are each connected to the ends of a pair of parallel bars 102. The bars 102 space the brackets 101 apart in parallel relationship forming a rectangular frame. To construct this frame, each bracket 101 includes as a pair of flanges 104 that extend outwardly and parallel from along the top and bottom edges, respectively, of a bracket web. The bar 102 ends are for fitting between which flanges 104, each receiving a coupling device, that is preferably a pivot, and is fitted through the bracket flanges and a bar end. The bars 102 have holes 105 formed through the mid-portions thereof for receiving fasteners 106, as set out below. Which mounting 100 is either for mounting onto the top surface of the newspaper tube 21 that is cantilevered from a top end portion of post 22, as shown in FIGS. 17 and 18 or onto a post 22 end, as shown in FIG. 19.

To provide for mounting mail box 110, as shown in FIGS. 17 and 18, the bracket 101 webs, proximate to their ends, include longitudinal slots 103 that receive fasteners, shown as bolts 107, fitted therethrough and through corner holes formed in a cover 111 of mail box 110. Prior to which mail box 110 mounting fasteners 106, shown as bolts, are fitted through center openings 105 formed through the bars that are, in turn, fitted through holes formed through the newspaper tube 21 top, with nuts 106a, shown in FIG. 18, turned over the bolt ends. Wood screws can be used in place of bolts 106 and nuts 106a, within the scope of this disclosure. With the frame mounted to the newspaper tube 21, the mail box 110 is seated, as set out above, and the bolts 107 are fitted through the mail box cover corner holes and through the bracket web slots 103 to receive washers 109 and nuts 108 turned onto which bolt 107 ends, as shown best in FIG. 18.

FIG. 19 shows another framed arrangement for mounting a mail box onto a post 22 end, which post 22 is shown as formed of wood, through it could be formed of solid plastic, or could be tubular with a top end insert, or a like arrangement, within the scope of this disclosure. The frame arrangement of FIG. 19, like that of FIG. 17, includes a pair of brackets 101, each with parallel flanges 104 extending from the edges thereof, and with a pair of bars 102 for positioning between which brackets. One of which bars 102, like the arrangement of FIG. 17, is connected at its ends between the flanges 104 by fasteners 104a, with the other bar 102 ends mounted to slide freely in longitudinal slots 104b formed in the flanges 104. With the mounting 100 fitted onto a post top end, shown in FIG. 19 as a wood post, and the bar 102 whose ends are mounted in longitudinal slots 104b moved to where the bar holes 102a in both bars 102 aligned with the wood post top surface, screws 113, or the like, are turned through holes 102a and into the post top, securing the mounting 100 thereto. Thereafter the mail box 110 is installed to the mounting as described hereinabove with respect to FIGS. 17 and 18.

Figure 21:
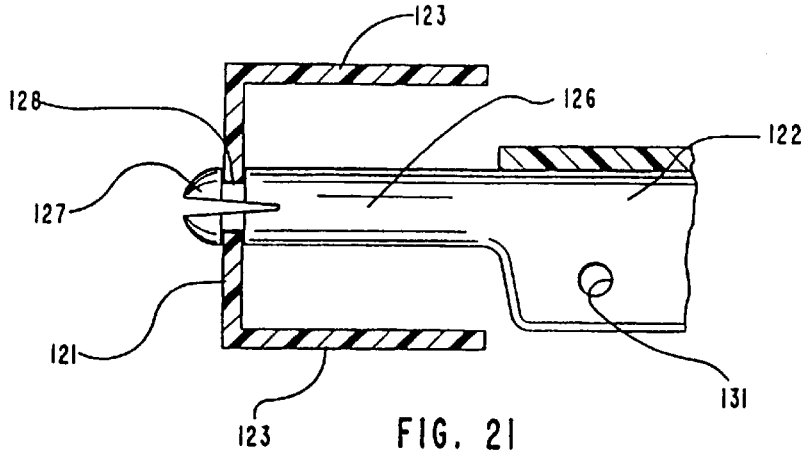
FIG. 21 shows an enlarged end sectional view of the mail box pivoting cross bar taken within the line 21—21 of FIG. 20.
Figure 22:
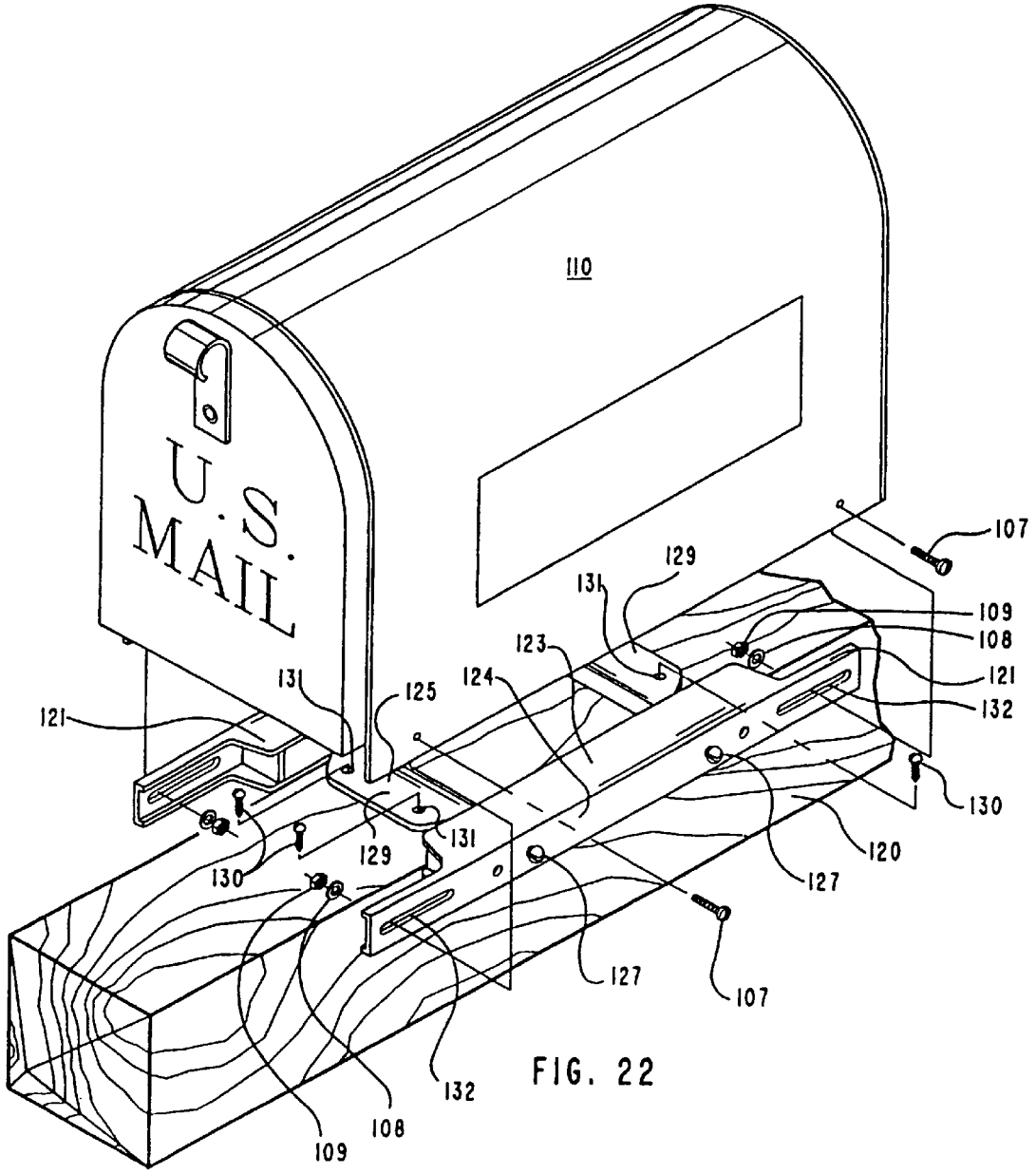
FIG. 22 shows a perspective view of the adjustable mail box mount of FIG. 20 utilized for mounting a mail box onto a wood beam.
Figure 23:
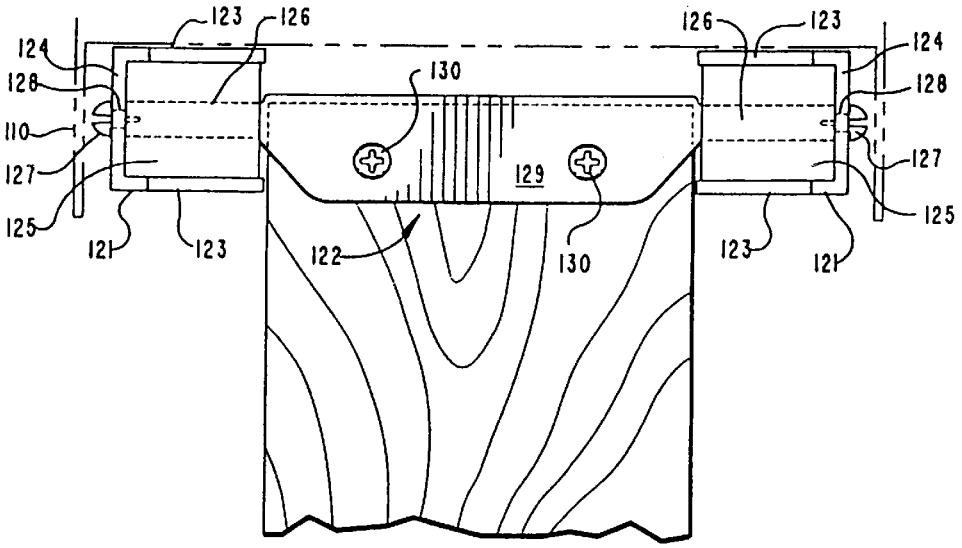
FIG. 23 shows an end elevation view of the adjustable mail box mount of FIG. 20 mounting a mail box onto a wood post end, the pivoting cross bar shown pivoted to the vertical, with screws turned therethrough and into the post sides.
Figure 24:
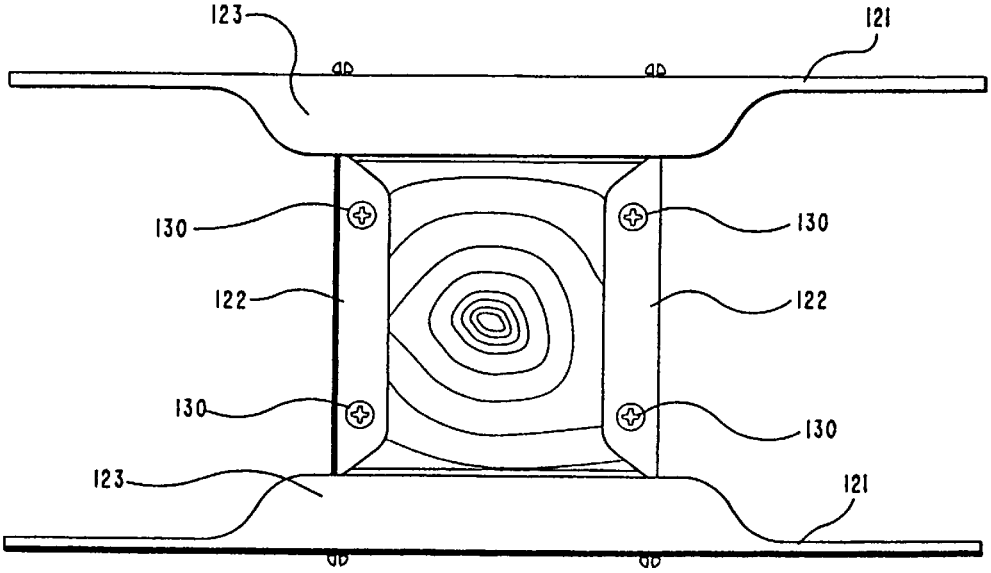
FIG. 24 shows a top plan view of the adjustable mail box mount of FIG. 20, with the pivoting cross bars shown pivoted to the horizontal and with screws turned therethrough and into the end of a wood post.

FIG. 20 shows another embodiment of a mounting 120 for mail box 110. The mounting 120, like the mounting 100, includes a pair of brackets 121 with bars 122 arranged therebetween. The brackets 121 each include parallel flanges 123 extending from opposite edges of a mid-section of a web 124, and include cross braces 125 secured therebetween, providing a rigid bracket structure. Shown best in FIGS. 20 and 21, the bar 122 ends are each necked down into sleeve 126 that is drilled longitudinally and threaded to receive a bolt 127 turned therein. Each bolt 127, as shown best in FIGS. 21 and 23, is fitted though a hole 128 formed through the bracket 121 and turned into the bar sleeve 126 end, forming a pivot coupling of which bar to the bracket. The bar 122 pivot coupling allows end bar to be pivoted to the attitudes shown, respectively: in FIGS. 20 and 22, where wide mid-portions 129 of each bar 122 extend oppositely; in FIGS. 21 and 23 where the mid-portions 129 are parallel and point downwardly; and FIG. 24, where in mid-portions 129 point towards one another. Which bar 122 positioning is maintained by turning the bolt 127 fitted through flange hole 128 tightly into the bar sleeve 126. With the bar 122 appropriately positioned fasteners, such as screws 130 can be turned through holes 131 formed in the bar mid-portions and into a wood beam, like that shown in FIG. 22, or into a top end of a wood post, like that shown in FIGS. 23 and 24, securing the mounting 120 onto which beam or post end. Thereafter, a mail box 110 can be mounted onto which mounting 120 utilizing the bolts, nuts, and washers 107, 108, and 109, respectively, shown in FIG. 17, secured through elongate slots 132, formed in the bracket 121 ends, as shown in FIG. 22. Where the mounting 120 is shown utilized for attaching a mail box 110 onto a wood beam or wood post, it should be understood that, like mounting 100 it can be used also for mounting a mail box onto a cantilevered plastic tube or post end, or like beam or post arrangement, within the scope of this disclosure.

Herein have been shown and described preferred arrangements of a post system and component elements and mountings thereof of the present invention. It should, however, be understood that the present disclosure is made by way of example only and that changes can be made thereto without departing from the subject matter coming within the scope of the following claims, and a reasonable equivalency thereof, which claims I regard as my invention.

I claim:

1. An adjustable mounting for a post system comprising, a ball segment and seat therefore, where said ball segment includes a body that is formed to have a hemispherical outer surface, has a center hole formed therethrough, and includes a means for mounting a bottom surface of said ball segment body onto a rigid surface; a bolt, as said means for mounting, that has a threaded top end and a means for mounting a lower end of said bolt to a rigid surface, which said means for mounting said bolt lower end provides a loose coupling to allow said bolt to pivot across said bolt lower end mounting; said seat includes a body wherein is formed a concave recess having a surface that is complementary to said ball segment surface, and includes a center hole, which said ball segment body and said seat center holes are counter sunk from a top surface of said seat through said ball segment body forming an inverted cone shaped opening with a flattened apex, to provide up to a twenty degree (20°) change in angle from a longitudinal center axis of said inverted cone shaped opening to accommodate said bolt threaded end fitted therethrough and through a washer means and is to receive a nut means turned thereover for clamping said ball segment and seat together; and means for mounting said seat body in a straight post.

2. An adjustable mounting for a post system as recited in claim 1, further including a means for increasing friction between the ball segment hemispherical surface and the seat concave surface.

3. An adjustable mounting for a post system as recited in claim 2, wherein the means for increasing friction is a gasket formed of a flexible slip resistant material.

4. An adjustable mounting for a post system as recited in claim 2, wherein the means for increasing friction is a scoring or grooving of the ball segment hemispherical surface.

5. An adjustable mounting for a post system as recited in claim 1, further including a straight post mount that is open longitudinally to receive a lower end of the straight post that is fitted thereover, and said straight post mount is arranged to receive the seat body secured across a bottom end thereof.

6. An adjustable mounting for a post system as recited in claim 1, wherein the means for coupling a post end is a post insert means that is a base wherein is formed the seat body and is secured across a bottom end of said post and means for securing said seat body across said post bottom end.

7. An adjustable mounting for a post system as recited in claim 1, wherein, as the means for mounting the bolt lower end to a rigid surface, the bolt end that is opposite to the bolt threaded end is flattened and includes a hole formed therethrough that is to receive a pin means fitted therein after said bolt flattened end has passed through a slot formed in a plate that is a top of a rigid surface to allow said bolt to pivot across said pin means mount.

8. An adjustable mounting for a post system as recited in claim 1, wherein, as the means for mounting the bolt lower end to a rigid surface, the bolt end that is opposite to the bolt threaded end is formed into a circle as an eyelet end to receive a pin means fitted therein after said eyelet end has passed through a plate that is a top of a rigid surface.

9. An adjustable mounting for a post system as recited in claim 1, wherein the straight post is hollow and the seat body for fitting across a lower end of said straight post includes a ridge that extends outwardly from around said seat body outer surface to fit snugly into a groove that has been formed around the inside of said post that is adjacent to said lower end of said post, as the means for mounting said seat body to said post.

10. An adjustable mounting for a post system as recited in claim 1, wherein the ball segment and seat are formed of a plastic material.

11. An adjustable mounting for a post system as recited in claim 1, wherein the side wall of the inverted cone shaped opening is at a ten degree (10°) angle from the longitudinal center axis of said inverted cone shaped opening.

*12. A support mounting system comprising:*

*a support member having a hollow lower end and an opening in said lower end, wherein said lower end comprises end sidewalls terminating in a perimeter end face surrounding the opening;*

*a mounting insert configured for attachment to the support member within the lower end, said mounting insert including a concave side which faces the opening in the lower end of the support member; and*

*securing means for intercoupling the mounting insert to a rigid support surface such that the perimeter end face of the support member is held thereby against said rigid support surface.*

*13. The support mounting system as defined in claim 12, wherein the mounting insert comprises a concavo-convex member.*

*14. The support mounting system as defined in claim 12, wherein the support member comprises a hollow square tube.*

*15. The support mounting system as defined in claim 12, wherein the support member and the mounting insert are made from a durable plastic material.*

*16. The support mounting system as defined in claim 12, wherein the mounting insert includes a center hole formed therein and a second side opposite the concave side, the system further comprising a washer plate having a center hole, said washer plate being configured for placement upon the second side of the mounting insert such that the center hole of said plate is disposed in alignment with the center hole of the mounting insert, wherein the securing means extends through the holes and against the plate.*

*17. The support mounting system as defined in claim 16, wherein the securing means comprises a bolt for securing to the support surface and extending through the center holes of the mounting insert and washer plate, and a nut member engaged with the bolt so as to reside against the washer plate.*

*18. The support mounting system as defined in claim 12, wherein the mounting insert comprises a hemispherical concavo-concave member.*

*19. The support mounting system as defined in claim 12, wherein the support member is hollow and includes main sidewalls having a port formed therein to permit access to the securing means, the system further comprising a plate removably secured to the support member so as to cover the port.*

*20. The support mounting system as defined in claim 12, wherein the end sidewalls include an interior surface having at least one interior slot formed therein, and wherein the mounting insert includes at least one ridge configured for snap-in lockable engagement within said at least one slot.*

*21. The support mounting system as defined in claim 12, wherein the mounting insert includes a plurality of radially-extending spaced apart ribs.*

*22. A support mounting system comprising:*

*a hollow tubular support member having a hollow lower end and an opening in said lower end, wherein said lower end comprises end sidewalls terminating in a perimeter end face surrounding the opening, wherein the support member is made from a durable plastic material;*

*a mounting insert comprising a concavo-convex member configured for attachment to the support member within the lower end, said mounting insert including a concave side facing the opening in the lower end of the support member, wherein the mounting insert is made from a durable plastic material and includes a center hole; and*

*a bolt configured for immovable attachment to a rigid support surface such that said bolt extends outwardly from said support surface, into the open end of the support member and through the center hole of the mounting insert; and*

*a nut member engageable with the bolt for securing the mounting insert with respect to the rigid support surface such that the perimeter end face of the support member is held thereby against said rigid support surface.*

*23. The support mounting system as defined in claim 22, wherein the support member comprises main sidewalls having a port formed therein to permit access to the nut member, the system further comprising a plate removably secured to the support member so as to cover the port.*

*24. The support mounting system as defined in claim 22, wherein the end sidewalls include an interior surface having at least one interior slot formed therein, and wherein the mounting insert includes at least one ridge configured for lockable engagement within said at least one slot.*

*25. The support mounting system as defined in claim 22, wherein the mounting insert includes a plurality of radially-extending spaced apart ribs.*

*26. A support mounting system comprising:*

*a support member having a hollow lower end and an opening in said lower end, wherein said lower end comprises end sidewalls terminating in a perimeter end face surrounding the opening;*

*a mounting insert configured for attachment to the support member within the lower end; and*

*securing means for intercoupling the mounting insert to a rigid support surface such that the perimeter end face of the support member is held thereby against said rigid support surface.*

*27. The support mounting system as defined in claim 26, wherein the support member comprises an interior surface defining an interior width and having at least one inner slot formed therein, and wherein the mounting insert is wider than said interior width and includes at least one edge configured for snap-in lockable engagement into said at least one slot.*

*28. The support mounting system as defined in claim 27:*

*wherein the mounting insert includes a concave side which faces the opening in the lower end of the support member;*

*wherein the support member comprises a substantially square cross section; and*

*wherein the support member comprises a flexible, resilient plastic material adapted to flex radially outwardly responsive to insertion of the wider mounting insert thereinto.*

*29. The support mounting system as defined in claim 27, wherein the interior surface of the support member comprises an interior circumference, and wherein the inner slot comprises a slot formed along the interior circumference of the support member.*

*30. The support mounting system as defined in claim 27, wherein the support member comprises a flexible, resilient plastic material adapted to flex radially outwardly responsive to insertion of the wider mounting insert thereinto.*

*31. The support mounting system as defined in claim 26, wherein the support member comprises a substantially rectangular cross section.*

*32. The support mounting system as defined in claim 31, wherein the support member comprises a substantially square cross section.*

*33. The support mounting system as defined in claim 26, wherein the mounting insert comprises at least one ridge that defines a perimeter of said mounting insert.*

*34. The support mounting system as defined in claim 12, wherein the support member comprises an outdoor-mountable post configured and adapted for supporting outdoor lateral loads imposed when a structural member becomes fixedly attached to said post and extends outward and sideways from said post.*

*35. The support mounting system as defined in claim 22, wherein the support member comprises an outdoor-mountable post configured and adapted for supporting outdoor lateral loads imposed when a structural member becomes fixedly attached to said post and extends outward and sideways from said post.*

*36. The support mounting system as defined in claim 26, wherein the support member comprises an outdoor-mountable post configured and adapted for supporting outdoor lateral loads imposed when a structural member becomes fixedly attached to said post and extends outward and sideways from said post.*

* * * * *